United States Patent
Duan et al.

(10) Patent No.: US 11,036,479 B2
(45) Date of Patent: Jun. 15, 2021

(54) DEVICES, SYSTEMS, AND METHODS OF PROGRAM IDENTIFICATION, ISOLATION, AND PROFILE ATTACHMENT

(71) Applicant: Georgia Tech Research Corporation, Atlanta, GA (US)

(72) Inventors: Ruian Duan, Atlanta, GA (US); Ashish Bijlani, Atlanta, GA (US); Taesoo Kim, Atlanta, GA (US); Wenke Lee, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 16/545,020

(22) Filed: Aug. 20, 2019

(65) Prior Publication Data

US 2020/0065074 A1 Feb. 27, 2020

Related U.S. Application Data

(60) Provisional application No. 62/723,034, filed on Aug. 27, 2018.

(51) Int. Cl.
| | |
|---|---|
| *G06F 8/41* | (2018.01) |
| *G06F 8/20* | (2018.01) |
| *G06F 16/903* | (2019.01) |
| *G06F 16/28* | (2019.01) |

(52) U.S. Cl.
CPC ........... *G06F 8/427* (2013.01); *G06F 8/20* (2013.01); *G06F 16/282* (2019.01); *G06F 16/90335* (2019.01)

(58) Field of Classification Search
CPC .. G06F 16/90335; G06F 16/282; G06F 8/427; G06F 8/20
USPC .................................................. 717/140–148
See application file for complete search history.

(56) References Cited

U.S. PATENT DOCUMENTS

| | | | | |
|---|---|---|---|---|
| 6,167,563 A | * | 12/2000 | Fontana | G06F 8/71 707/999.103 |
| 6,473,794 B1 | * | 10/2002 | Guheen | H04L 41/22 709/223 |
| 6,519,571 B1 | * | 2/2003 | Guheen | G06Q 30/02 705/14.66 |

(Continued)

OTHER PUBLICATIONS

Feder et al, "Hierarchical Universal Coding", IEEE, pp. 1354-1364 (Year: 1996).*

(Continued)

*Primary Examiner* — Anil Khatri
(74) *Attorney, Agent, or Firm* — Troutman Pepper Hamilton Sanders LLP; Ryan A. Schneider

(57) ABSTRACT

A method including: parsing a program to identify a plurality of features within the program; performing a first match of the plurality of features to a plurality of code files based on a hierarchical code index, the features corresponding to leaf nodes of the hierarchical code index and the code files corresponding to parent nodes of the leaf nodes; normalizing the first match results to weight against common features; performing a second match of the plurality of code files to one or more code repositories based on the hierarchical code index; normalizing the second match results to weight against common files; and identifying a code repository of the one or more code repositories as being included within the program.

16 Claims, 6 Drawing Sheets

(56) References Cited

U.S. PATENT DOCUMENTS

| | | | | |
|---|---|---|---|---|
| 6,539,543 | B1* | 3/2003 | Guffens | G06F 8/447 717/151 |
| 6,609,128 | B1* | 8/2003 | Underwood | G06F 9/454 707/610 |
| 6,714,905 | B1* | 3/2004 | Chang | G06F 40/205 704/9 |
| 6,718,535 | B1* | 4/2004 | Underwood | G06F 9/451 717/101 |
| 6,907,546 | B1* | 6/2005 | Haswell | G06F 11/3684 714/38.11 |
| 6,996,804 | B2* | 2/2006 | Stoodley | G06F 9/4843 717/116 |
| 7,133,865 | B1* | 11/2006 | Pedersen | G06F 16/24539 |
| 7,165,041 | B1* | 1/2007 | Guheen | G06Q 30/04 705/26.1 |
| 7,315,826 | B1* | 1/2008 | Guheen | G06Q 10/06 705/7.29 |
| 8,121,874 | B1* | 2/2012 | Guheen | G06Q 10/087 705/7.11 |
| 8,307,351 | B2 | 11/2012 | Weigert | |
| 8,352,935 | B2* | 1/2013 | Isaacson | G06F 8/61 717/173 |
| 8,566,777 | B2* | 10/2013 | Chaar | G06F 8/36 717/101 |
| 8,799,282 | B2* | 8/2014 | Goldenberg | G06F 16/2462 707/736 |
| 8,826,240 | B1* | 9/2014 | Lachwani | G06F 8/30 717/126 |
| 10,296,309 | B1* | 5/2019 | Mercille | G06F 8/30 |
| 10,534,604 | B1* | 1/2020 | Kimball | G06F 8/72 |
| 10,545,974 | B2* | 1/2020 | Brunel | G06F 16/248 |
| 2016/0350380 | A1* | 12/2016 | Finis | G06F 16/2246 |

OTHER PUBLICATIONS

Liu et al, "Query Understanding Enhanced by Hierarchical Parsing Structures", IEEE, pp. 72-77 (Year: 2013).*

Pauls et al, "Hierarchical Search for Parsing", ACM, pp. 557-565 (Year: 2009).*

Feng et al, "B2SFinder: Detecting Open-Source Software Reuse in COTS Software", IEEE, pp. 1038-1049 (Year: 2019).*

Qu et al, "Software Reuse Detection Using an Integrated Space-Logic Domain Model", IEEE, pp. 638-643 (Year: 2007).*

Roy et al, "An Empirical Study of Function Clones in Open Source Software", IEEE, pp. 81-90 (Year: 2008).*

Le et al, "An Empirical Study of Architectural Decay in Open-Source Software", IEEE, pp. 176-185 (Year: 2018).*

Paulson et al, "An Empirical Study of Open-Source and closed-Source Software Products", IEEE, pp. 246-256 (Year: 2004).*

Backes, et al., "Reliable Third-Party Library Detection in Android and its Security Applications," 2016 Proceedings of the 23rd ACM Conference on Computer and Communications Security (CCS).

Kim, et al., "Open Source Software Detection Using Function-Level Static Software birthmark," Journal of Internet Services and Information Security Nov. 4, 2014 vol. 4:4 pp. 25-37.

Choi, et al., "A Static Birthmark of Binary executables Based on API Call Structure," 2007 Proceedings of 12th Advances in Computer science Converence: Computer and Network Security Doha, Qatar 2-16.

Hemel, et al., "Finding Software License Violations Through Binary Code Clone Detection," 2011 Proceedings of the 8th Working conference on Mining Software Repositories, Honolulu, HI.

* cited by examiner

DEVICES, SYSTEMS, AND METHODS OF PROGRAM IDENTIFICATION, ISOLATION, AND PROFILE ATTACHMENT

CROSS-REFERENCE TO RELATED APPLICATIONS

This application claims priority to U.S. Provisional Patent Application Ser. No. 62/723,034, filed on Aug. 27, 2018, which is incorporated herein by reference in its entirety as if fully set forth below.

STATEMENT REGARDING FEDERALLY SPONSORED RESEARCH OR DEVELOPMENT

This invention was made with government support under Award Nos. CNS-0831300, CNS-1017265, DGE-1500084, CNS-1563848, SFS-1565523, CRI-1629851, and CNS-1704701 awarded by the National Science Foundation (NSF). The government has certain rights in the invention.

SEQUENCE LISTING

Not Applicable

STATEMENT REGARDING PRIOR DISCLOSURES BY THE INVENTOR OR A JOINT INVENTOR

Not Applicable

BACKGROUND OF THE DISCLOSURE

1. Field of the Invention

This disclosure relates generally to the program identification and, more specifically, to devices, systems, and methods of identifying and isolating program portions subject to use restrictions and vulnerability issues.

2. Description of Related Art

Software provenance is an important issue for a number of technical and practical challenges, including, for example, security assessment, vulnerability identification and remediation, and use and ownership restrictions. For example, modern programs quickly reach the equivalent of ten thousand or more pages of code and are often written by teams of people. Moreover, in order to shorten development cycles, developers often focus on unique features, while integrating or referencing existing third-party code (e.g., open source software or "OSS") and libraries. Thus, as software programs have become increasingly more complex and interconnected, and determining the provenance of any program or portion of a program is an increasingly difficult issue.

Despite the benefits from utilizing third-party code, such code can introduce significant legal and security risks, which if ignored or undetected can jeopardize security and privacy of end users, as well as cause high financial loss. Two common issues that arise from the use of third-party code are security risks and software license violations. For instance, if a developer incorporates third-party code into his program and the third-party code is later discovered to include a vulnerability, this vulnerability could be exploited to hijack the developer's program and/or end-users' systems. Moreover, while the third-party code may be patched in subsequent releases to address discovered vulnerabilities, this would not protect users of the developer's program unless the program is likewise updated to include the newer version of the third-party code. Furthermore, by using third-party code, the developer is often bound by associated licensing terms as determined by the third-party developer. Failure to comply with those licensing terms could have legal ramifications including, for example, suit for copyright infringement or a requirement to freely distribute the developer's program.

To obviate these and similar issues, developers must diligently document, track, and manage all third-party components used in their programs. In particular, developers not only need to track all third-party components being used and regularly update them with security fixes, but also comply with the license policies and best practices for all third-party components, adapting to any changes to licenses across versions. Not only that, but developers would have to any additional third-party code embedded within the third party code used by the developer. In other words, if Developer A used Developer B's code, and Developer B used Developer C's code, Developer A would not only have to track Developer's B's code but also Developer C's code, the use of which Developer A may not even be aware. However, manually managing multiple third-party components, their versions, and interdependencies can quickly become very tedious and error-prone. Consequently, while some developers may ignore the need for managing third-party code to avoid additional overhead, others may fail to correctly manage them due to ignorance, lack of expertise, or simple error, thereby inadvertently introducing security risks and license violations into their programs.

In the related art, certain code reuse detection approaches have been attempted. However, each of these approaches has various limitations. For example, code clone detection identifies the reuse of code fragments across source repositories, but rely on the availability of source code for both the developer's program and the third-party code. Other approaches in the relates art are tightly tied to a single programming language or environment, are unable to scale, cannot distinguish between embedded software (e.g., distinguishing between Codes A, B, and C when Codes B and C include a copy of Code A), and/or utilize computationally and storage intensive birth-marking processes to identify third-party code. These drawbacks limit the use and usability of the related art approaches.

Thus, there is an unmet need for improvements to program identification that can be done accurately and with minimal resource intensity or overhead. Aspects of the present disclosure relate to these and other issues.

BRIEF SUMMARY OF THE INVENTION

The disclosed technology provides systems, devices, and methods for program identification. In an embodiment, there is provided a method including: parsing a program to identify a plurality of features within the program; performing a first match of the plurality of features to a plurality of code files based on a hierarchical code index, the features corresponding to leaf nodes of the hierarchical code index and the code files corresponding to parent nodes of the leaf nodes; normalizing the first match results to weight against common features; performing a second match of the plurality of code files to one or more code repositories based on the hierarchical code index; normalizing the second match results to weight against common files; and identifying a code repository of the one or more code repositories as being included within the program.

In an embodiment, there is provided a system including: one or more processors; and one or more memories have stored thereon instructions that, when executed by the one or more processors, control the one or more processors to: identify files within a computer to identify a plurality of files within a program code, the program code being organized in accordance with a hierarchical structure having a root repository; generate a feature identifier for each of a plurality of respective features of each of the plurality of files; derive a file identifier for each of the plurality of files based on the identifiers for the respective features of the plurality of files; derive a node identifier for each level of the hierarchical structure based on the files included therein; and map the features, file, and node identifiers as parent-child relationships within a hierarchical index based on the hierarchical structure of the program code.

In an embodiment, there is provided a non-transitory computer readable medium having stored thereon instructions for performing a method including: parsing a program to identify a plurality of features within the program; and identifying a third-party code included within the program by: matching the plurality of features to a plurality of leaf nodes of a hierarchical index structure, recursively matching the nodes to higher level nodes within the hierarchical index structure to identify a top-level repository node match, and identifying the third-party code corresponding to the top-level repository node.

BRIEF DESCRIPTION OF THE SEVERAL VIEWS OF THE DRAWINGS

Reference will now be made to the accompanying Figures, which are not necessarily drawn to scale, and wherein.

DETAILED DESCRIPTION OF THE INVENTION

Some implementations of the disclosed technology will be described more fully with reference to the accompanying drawings. This disclosed technology may, however, be embodied in many different forms and should not be construed as limited to the implementations set forth herein.

According to some aspects of the present disclosure, there may be formed (or provided) a novel hierarchical index third-party programs which enable both accuracy and scalability. In some cases, syntactical features, such as string literals and exported functions when matching native libraries against third-party sources, are used to form the index. Benefits of these features include ease of extraction and preservation across stripped libraries. Moreover, in order to overcome obfuscation techniques, some implementations may rely on string constants and obfuscation-resilient features, such as normalized classes and function centroids as features.

One approach in the related art relies on a direct (inverted) mapping of features to the target third-party code. However, this approach fails to consider large code duplication, suffering from low detection accuracy and poor scalability. Indexing multiple versions of a same third-party program further adds to the problem. Accordingly, some embodiments use a novel hierarchical indexing scheme that leverages the structured layout of program code (e.g., creating a tree of files and directories) to apply multiple heuristics for improving both scalability and the detection accuracy. To detect the use of third-party code in a program, similar features are extracted from the program, and these features are queried against the table to identify the third-party code.

Example implementations of the disclosed technology will now be described with reference to the accompanying figures.

Figure 1:
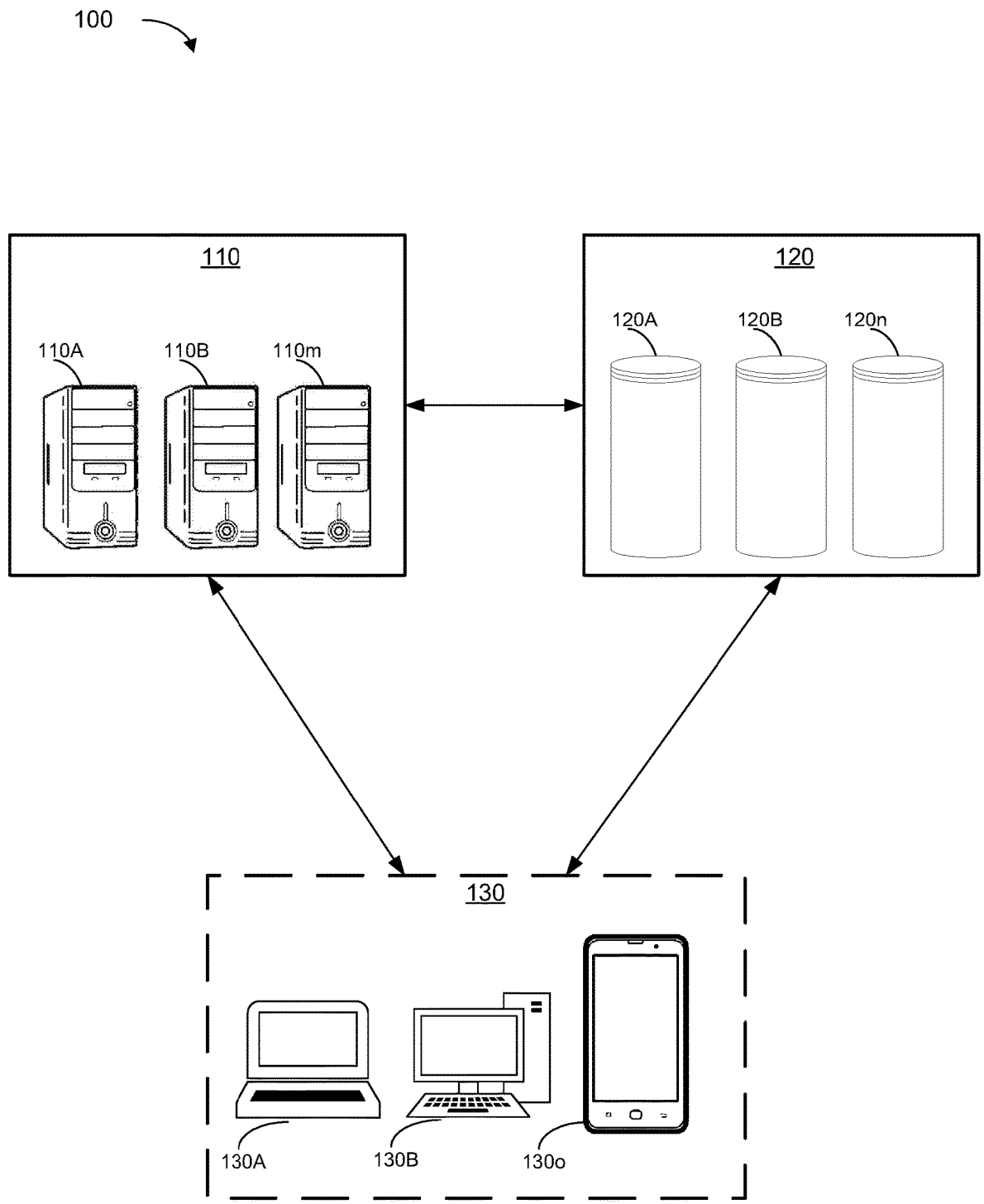
FIG. 1 illustrates an environment in which aspects of the present disclosure may be implemented.

FIG. 1 illustrates a system environment 100 in which endpoint connection and communication in accordance with some examples of the present disclosure may be performed. The components and arrangements shown in FIG. 1 are not intended to limit the disclosed embodiments as these components and features may vary. In FIG. 1, the system environment 100 can include one or more identifications servers 110, one or more databases 120 (e.g., hierarchical databases 120), and one or more terminals 130. In some examples, server 110, database 120, and terminal 130 may communicate with one another. Server(s) 110, database(s) 120, and terminal(s) 130 may each include one or more processors, memories, and/or transceivers. As non-limiting examples, terminal(s) 130 may be cell phones, smartphones, laptop computers, tablets, or other personal computing devices that include the ability to communicate on one or more different types of networks. Server(s) 110 and/or the one or more databases 120 may include one or more physical or logical devices (e.g., servers, cloud servers, access points, etc.) or drives. Example computer architectures that may be used to implement terminal(s) 130, server(s) 110, and database(s) 120 are described below with reference to FIG. 5.

In some cases, server(s) 110 may serve built the hierarchical third-party code index and/or match a program to the index. In some cases, server(s) 110 may extract features from third-party code files (e.g., source or binary files), to create an index for efficient lookup and storage. In some instances, server(s) 110 use an expression-based feature extractor. Server 110 may extract, for example, strings and exported function names from native libraries, string constants, normalized classes, and centroids. In some cases, a fuzzy parser is used instead of or in addition to the expression-based extractor to parse all third-party code files (e.g., source files). The parser may retrieve string literals and function names from source files, and also extract parameter types, class names, and name spaces, which are preserved in notice libraries. In cases with missing configuration files and/or external dependencies, the parser can infer the semantic context and insert dummy identifiers for missing data types. Function bodies may not be parsed to accelerate index generation.

To preserve the hierarchical layout of third-party programs for content deduplication, server 110 may separately index source and header files. Moreover, common strings and functions defined in standard framework and system include files may be skipped as they may dilute matching results because of their popularity across sources. However, servers 110 may enable all #include directives, to resolve data types defined in header files and correctly identify function names and string literals that are wrapped in preprocessing macros, but are referenced in source files.

Server 110 may also specially process code within conditional preprocessing directives (e.g., #if and #else branch directives), as such directives could also be skipped because of configuration options. Thus, server 110 may form conditional groupings of extracted features. Server 110 may detect commented out pieces of code (e.g., #if 0 or #elseif 0), and skip such cases. Server 110 may also skip specific macros that are not relevant for a given index (e.g., arch-specific macros, or macros relating to different operating systems).

With a completed hierarchical index, server 110 may match a program to third-party code. Server 110 may extract features from the program such as strings and exported function names from native libraries, string constants, normalized classes and centroids (e.g., similarly to feature extraction of third-party code). These features are then compared to the hierarchical index in a bottom-up approach to identify integrated third-party code and distinguish between various alternative codes and/or versions. In some cases, server 110 may perform one or more of program marking (e.g., highlighting the portion of the program that includes the third-party code), profile generation (e.g., creating a profile of the program with matches and attaching the same to the program), isolating the third-party code (e.g., in the event that third-party code containing a vulnerability is determined, server 110 may deactivate the third-party code within the application corresponding to the vulnerability), and replacing the third-party code (e.g., with an updated version).

Database(s) 120 may include repositories of third-party code (e.g., for creating the index) as well as the index created by server(s) 110. In some cases, database 120 may implement a crawler for identifying and extracting new third-party code from various sources. In some cases, database 120 may tag newly discovered third-party code with, for example, license or version information derived from the source. Database 120 may provide the third-party code to server 110 and receive the hierarchical index from server 110.

Terminal 130 may run or store program code, such as an application. Terminal 130 may provide the program to server 110, which matches the program to the hierarchical index. Terminal 130 may receive the match results from server 110. In some cases, terminal 130 may update the program based on the match results. For example, terminal 130 may remove or deactivate the portion of the program corresponding to vulnerable third-party code. As another example, terminal 130 may replace a vulnerable version of the third-party code with an updated version of the third-party code, thus removing the vulnerability from the application.

One of ordinary skill will recognize that the systems and functions described above are merely examples, and that various changes, alternatives, and additions are consistent with the present disclosure. Although server 110, database 120, and terminal 130 are described as separate devices with separate functions, one of ordinary skill will recognize that the functions of these devices may be combined or switched among one or more physical and/or logical devices. As non-limiting examples, in some cases, database 120 may be included within server 110, and terminal 130 may match the program to the hierarchical index.

Figure 2A:
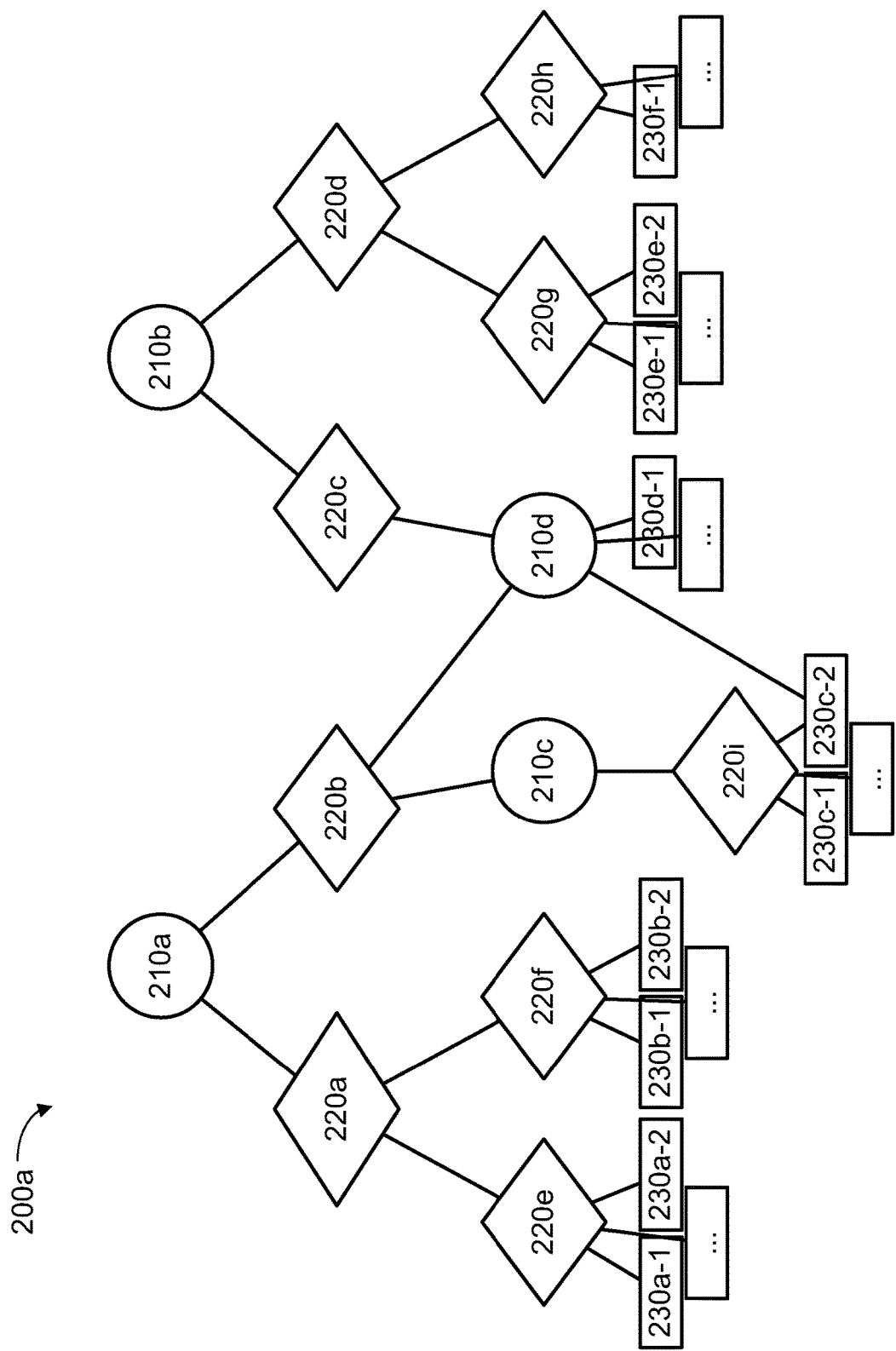
FIGS. 2A and 2B illustrate examples of a hierarchical index according to an example.

FIG. 2A illustrates a third-party hierarchical index structure 200a in accordance with an example embodiment. FIG. 2A illustrates a structure 200a for two third-party codes 210a and 210b. Each repository 210a and 210b includes one or more directories 220a-220d. The directories 220a-220d may, in turn, include additional directories 220e-220h or repositories 210c and 210d. In some cases, the additional repositories may include additional directories (e.g., 220i).

Eventually, the structure reaches leaf nodes representing features 230a-1-230f-1 (e.g., strings, functions, etc.) of the parent nodes. The index structure may mimic or leverage the modularized layout of third-party sources (e.g., the file structure of modern code).

Furthermore, by linking shared repositories and features, code duplication may be readily identified and addressed for the matching determination. For example, clones can be filtered during matching, or weighted differently based on the other detected features. For instance, since feature 230c-2 is a feature of both 220i and 210d, this feature cannot aid in distinguishing between 220i and 210d, but can be used to distinguish between 220i and 220f.

Figure 2B:
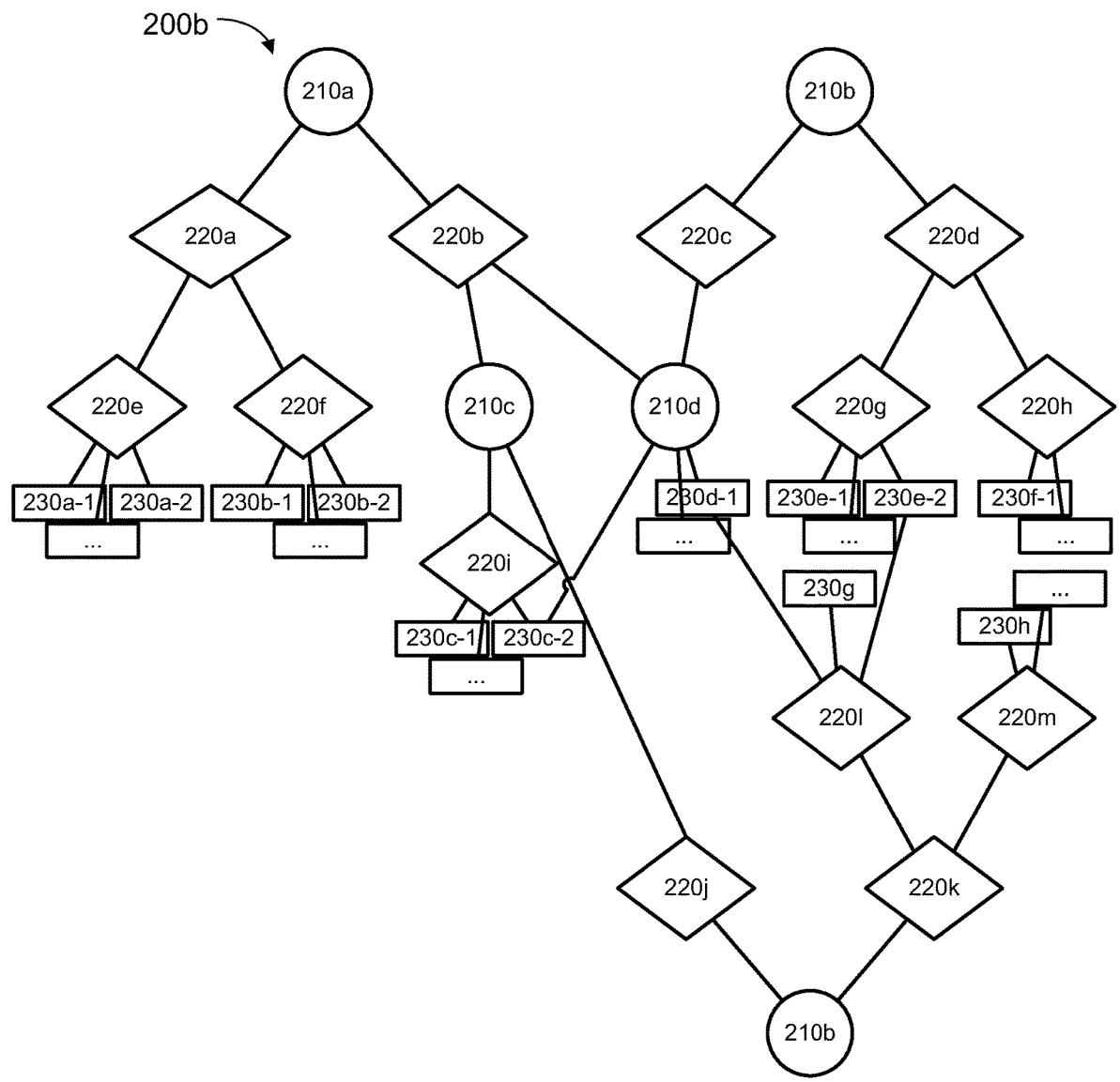

FIG. 2B illustrates a third-party hierarchical index structure 200a in accordance with an example embodiment. FIG. 2B adds a third third-party code to the index structure 200a discussed above with reference to FIG. 2A. Referring to FIG. 2B, third-party code repository 210c includes one or more directories 210j and 210k. The directories 210j and 210k, in turn, include additional repositories 220l and 220m and directory 210c. As additional third-party codes are analyzed and added to the index structure 200b, further overlapping code portions and unique features may be identified.

Figure 3:
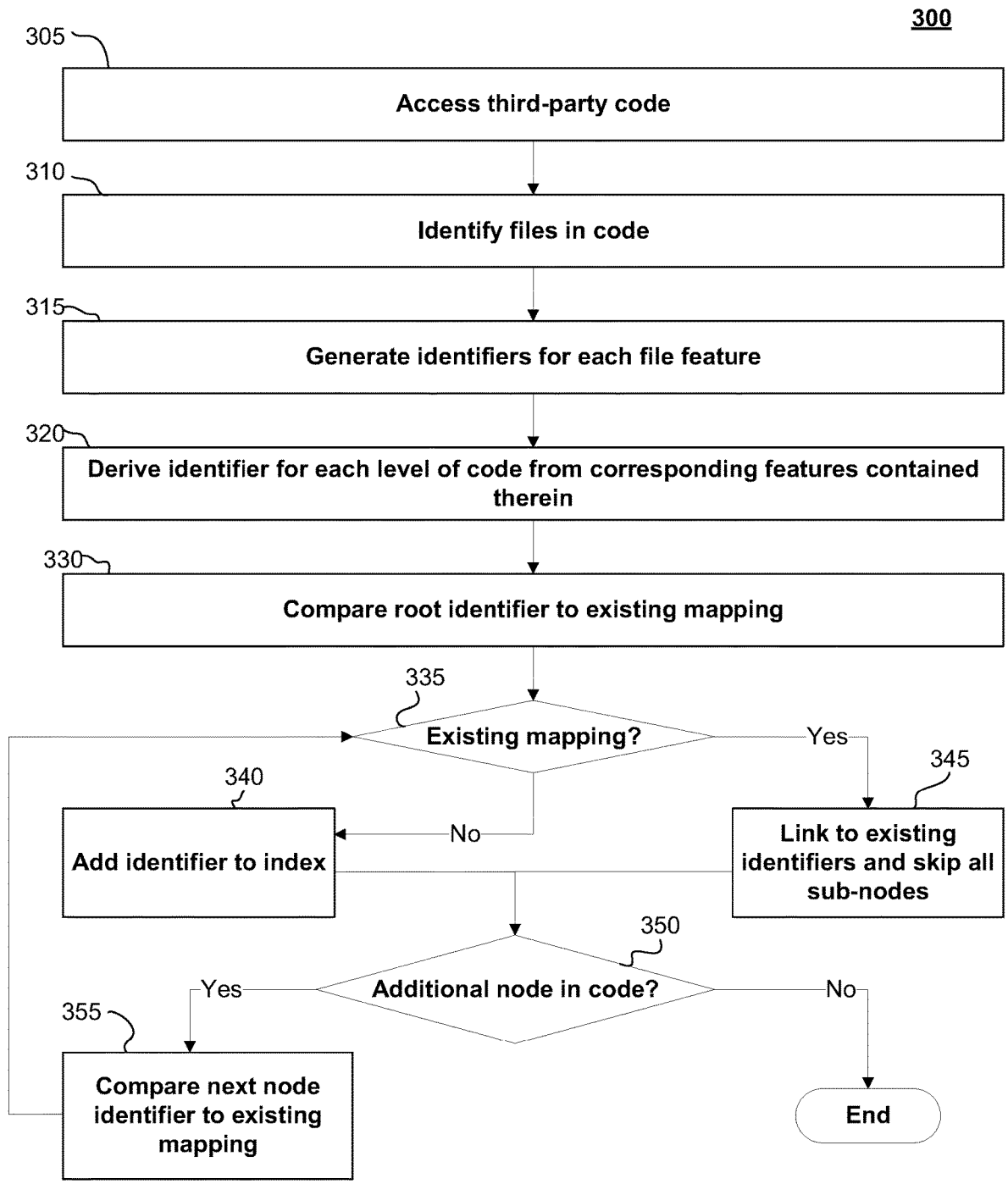
FIG. 3 is a flowchart of a method of generating an index according to an example.

FIG. 3 is a flowchart 300 of a method of hierarchical indexing according to aspects of the present disclosure. As a non-limiting example, the hierarchical indexing may be performed by server 110. Referring to FIG. 3, server 110 accesses 305 third-party code. For example, server 110 may be provided with the third-party code (e.g., from database 120) or may crawl code repositories for third-party code.

Server 110 identifies 310 files in the code. In some cases, server 110 may identify 310 all files in the code. However, this is merely an example; in certain cases, certain files and directories may be ignored. For example, commonly occurring function names, such as main or test, do not contribute to the uniqueness of an third-party code, and the long list of parent mappings (i.e., third party codes with such features) wastes storage space and increases search time. Therefore, in some cases, such overly common files or folders may be ignored.

Server 110 may identify 310 the files and features with a parser (e.g., a fuzzy parser) to extract, for example, string literals, function names, parameter types, class names, and namespaces for functions. In some cases, server 110 may skip function bodies to speed up the parsing process, using only function names and their arguments in the feature set. To preserve the hierarchical layout of third-party code for content deduplication, server 110 may separately index source and header files. As a result, server 110 may skip common strings and functions defined in standard framework and system include files that tend to dilute matching results because of their popularity across several source third-party codes.

Server 110 generates 315 an identifier for each feature of the identified files. The feature identifier may be generated from a hash (e.g., a 128-bit md5 hash) of the features (e.g., string literals, function names, parameter types, class names, and name spaces). Server 110 then derives 320 an identifier for each level above the features (e.g., file, directory, repository) within the third-party code. As a non-limiting example, server 110 may use a Locality Sensitive Hashing (LSH) algorithm to assign identifiers to each non-leaf node. The LSH algorithm may take a high dimensional feature set and map them to a fixed size hash.

Server 110 then maps the parent-child relationships and identifiers to the index. For example, server 110 compares 330 the root node identifier to existing mappings in the index and links the identifier to any parent nodes. For example, Hamming-distances between the identifier and existing identifiers may reveal cosine similarity between the original feature set. Since the Hamming distance between different identifiers reflects their similarity, before inserting a new mapping from a feature to a parent node, server 110 can determine whether a Hamming distance is less than a particular threshold (i.e., if the node is close enough to an existing identifier), then server 110 skips populating the hierarchical index table for that node. If a node happens to be a large file and is similar to an existing node, then the content-based deduplication design achieves significant storage savings, especially when compounded over a large number of programs with overlapping nodes.

Server 110 may specially process conditional processing directives (such as #if and #else branch directives), which could also be skipped because of default configuration options (e.g., operating system). Server 110 may process the code within such directives separately, forming a conditional group of extracted features. For example, if a code includes a conditional "#ifdef Test_Functions," which includes functions "test1( )" and "test2( )," then the indexing for functions "test1( )" and "test2( )" can be indexed under the condition "Test_Functions" as they will only be found in a binary if the "Test_Functions" condition is active. Moreover, if test1( ) is present test2( ) must be present for the "Test_Functions" condition. In a case with conditional code, all features of the relevant condition should be present or absent (i.e., whether the conditional branch was included in the binary or not). Thus, the conditional branching may be used to further distinguish code samples.

If the mapping does not exist (335-N), server 110 links 345 the identifier to the existing identifier and excludes all children identifiers from the mapping. If an unanalyzed and un-excluded node exists in the code (350-Y), server 110 compares 355 a next node to the existing mapping. This repeats until all nodes are analyzed or excluded (350-N) and the mapping ends. The index may be stored in database 120.

For efficiency, the mapping may be performed in top-down fashion because if a parent node is known in the index, its children must be known as well. However, this is merely an example. In some cases, mappings may be done in parallel or bottom-up approach.

In some cases, popular features (e.g., those present in a significant number or percentage of third-party code) do not contribute to parent identification. Furthermore, the extensive parent mappings waste storage space and decrease identification concepts. Thus, in some instances, such popular features are ignored for mapping purposes (e.g., if a certain feature is related to more than a threshold number of parent nodes, the feature is no longer mapped).

Additionally, to enable accurate version pinpointing, server 110 may also track unique traits across code versions for each third-party code in the indexing phase. For example, server 110 may include separate indexing of unique features and/or versioning information to distinguish between versions of a same code.

A pseudo-code example of hierarchical indexing is provided below if Table 1:

TABLE 1

Indexing pseudo-code.

procedure IndexRepo(root, info)
    file2Features ← ∅

TABLE 1-continued

Indexing pseudo-code.

```
for file ∈ root do
    file2Features[file] ← parser(file)
path2Id ← ∅
dir2Features ← ∅
dir2Children ← ∅
for (file, features) ∈ file2Features do
    path2Id[file] ← Hash(features)
    for feat ∈ features do
        UpdateIndexDB(Identifier(feat),path2Id[file])
    UpdateVersionDB(features,info)
    child ← file
    while child ≠ root do
        parent ← parentof(child)
        dir2Features[parent].add(features)
        dir2Children[parent].add(child)
        child ← parent
for (dir, features) ∈ dir2Features do
    path2Id[dir] ← Hash(features)
IndexDir(root,dir2Children,path2Id)
AddMappingToDB(path2Id[root],info)
procedure IndexDir(dir,dir2Children,path2Id)
    children ← dir2Children[dir]
    for child ∈ children do
        if IsUnIndexed(child)
            IndexDir(child,dir2Children,path2Id)
            continue
        UpdateIndexDB (path2Id[child],path2Id[dir])
procedure UpdateIndexDB(f,n)
    AddMappingToDB(f,n)
    AddMappingToDB(n,f)
```

Figure 4:
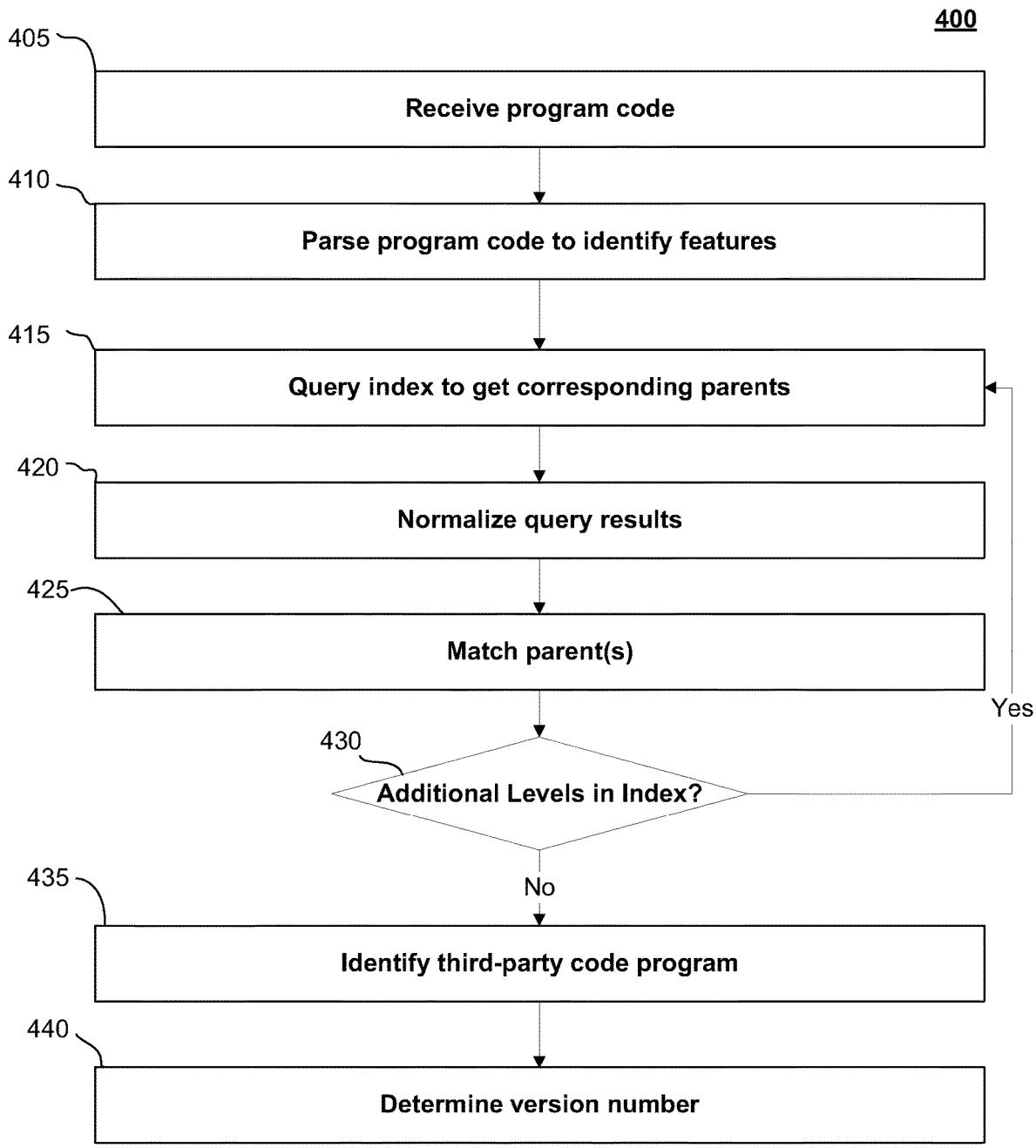
FIG. 4 is a flowchart of a method of hierarchical matching according to an example.

FIG. 4 is a flowchart 400 of a method of matching according to aspects of the present disclosure. As a non-limiting example, the hierarchical matching may be performed by server 110. Server 110 may leverage the program layout information preserved in the index to improve the accuracy of ratio-based similarity detection and filtering out duplicate sources. For instance, server 110 may utilize a term frequency-inverse document frequency (TFIDF) metric that assigns greater weight to unique parts of nodes and penalized non-unique parts.

In an embodiment, server 110 may determine a normalized matching score related to the following equation:

$$NormScore(p) = \frac{\sum_{1}^{n} f_{c_i} \times \log\frac{N_P}{R_{c_i}}}{\sum_{1}^{n} F_{c_i} \times \log\frac{N_P}{R_{c_i}}} \quad \text{Eq. (1)}$$

In equation (1), c denotes child nodes and p denotes parent nodes in the hierarchical index, $N_p$ denotes the total number of parent type nodes in the database, and $f_{ci}$, $F_{ci}$, and $R_{ci}$ denote the number of matching features, number of total features, and number of matching parent nodes (i.e., references) of the i-th child node, respectively. The $$\log\frac{N_P}{R_{c_i}}$$

may be used to weight the matching features.

Referring to FIG. 4, server 110 receives 405 the program code for matching. For example, server 110 may receive (e.g., from a terminal 130) a binary file of a program desired to be matched. Server 110 then parses 410 the program code to identify all features of the program. The features identified by the server 110 may be the same type of features (e.g., string literals, function names, parameter types, class names, and name spaces) as those identified when building the index. Server 110 may also generate fingerprints corresponding to the features. In a case with conditional code, all features of the relevant condition should be present or absent (i.e., whether the conditional branch was included in the binary or not).

Server 110 queries 415 the database with the identified features (e.g., fingerprints of the identified features) to identify corresponding parent files from the index. Server 110 normalizes 420 the search results, for example, using TFIDF metric. In some cases, Server 110 also tracks the total numbers of matched features, since the normalized score tracks matched ratios and not matched count. Based on the normalized results, the features are matched 425 to one or more parents.

In some cases, server 110 may apply matching rules to improve results and/or filter out false positive. For example, server 110 may skip sub-directories of third-party code include a license, since they are likely to be clones of other third-party code. In an embodiment, server 110 may skip source files that match a low ratio of functions or header files that match low ratio of features, since they may be inapplicable (e.g., tests, examples, or unused code such as partial builds). Additionally, server 110 may skip overly-"popular" files and directories (as compared to their siblings) as these may be generic files for directories (where popularity refers to a number of matching parent nodes for each node (Rci) or how highly linked a node would be).

If the parents are not top-level nodes of the index (430-Y), the index is queried 415 with the files found previously. This process repeats until top-level matches are determined (430-N). Top-level matches may be indicated by a special flag. For example, top-level directories (e.g., root directories) have certain unique features, such as including LICENSE, README, and/or MAINTAINERS files. When a developer imports a third-party project (e.g., library), a top-level directory of that project will include these features. Thus, when the system identifies a directory that includes these features, it can be identified as being a root directory of a project (e.g., imported code). As will be understood, in some cases, a top-level match may not be a top level of the index. For example, if third-party Code B includes a copy of third-party Code A, and Program C includes a copy of Code A but not Code B, a node representing Code A would be a top-level query result for Program C even though Code B would be represented by a parent node of Code A.

Once all levels are matched (430-N), server 110 identifies 435 third-party code included in the program. Based on the detected third-party code, server 110 determines 440 the version of the third-party code. For example, server 110 may compare the features from the program with unique features across third-party code versions. In some cases, server 110 may leverage co-location information (e.g., relative closeness of two strings or functions in a binary) preserved in the binary and indexing table (bi-directional mapping between parents and children), refining unique features to be considered valid if all the other features in the same file/class also match.

A pseudo-code example of hierarchical matching is provided below in Table 2:

TABLE 2

Matching pseudo-code.

```
procedure MatchBinary(progromCode)
    features ← Parser(programCode)
    repos ← ∅
    while sizeof(features) > 0 do
        parents ← GetParentsFromDB(features)
        for p ∈ parents do
            if IsMatchingRepo(p) then
                repos.add(p)
        p2Children ← ∅
        for p ∈ parents do
            p2Children[p] ← GetChildrenFromDB(p)
        p2NormScore ← ∅
        p2CumScore ← ∅
        for (p,children) ∈ p2Children do
            p2NormScore[p] ← NormScore(p,children)
            p2CumScore[p] ← CumScore(p,children)
        features ← ∅
        for p ∈ parents do
            if ¬MatchingRules(p) then
                continue
            ns ← p2NormScore[p]
            cs ← p2CumScore[p]
            if ns ≥ T_{NormScore} ∧ cs ≥ T_{CumScore} then
                features.add(p)
    versions ← SearchVersionDB(repos, features)
    return repos,versions
```

Once the system and versions are identified, the server 110 may take remedial measures. In some cases, server 110 may generate a code profile for the program that includes a list of all potential security vulnerabilities or license issues that may be caused by the inclusion of third-party code, and may also include the solutions, alternative, or descriptions of these issues. Each program may include multiple profiles (each distinct and separate) that detail a specific third-party code, vulnerability, and/or potential license issue.

In some instances, server 110 may isolate, deactivate, or remove third-party code that is identified to include a security vulnerability. In certain cases, server 110 may rate (or provide a rating) for third-party code vulnerabilities, and may only be deactivated the code if the vulnerability if above a certain level. In an embodiment, server 110 may replace vulnerable third-party code with patched versions of the third-party code, automatically patch the code to fix the security issues, or provide recommendations to replace or update the third-party code version to the program owner.

Although the methods described above are discussed with reference to server 110, this is merely an example. One of ordinary skill will recognize that, in some embodiments, the functions described above may be performed by one or more servers 110 and/or terminals 130. Additionally, various changes, alternatives, additions, or modifications would be obvious to one of ordinary skill without departing from the scope of the present disclosure.

Figure 5:
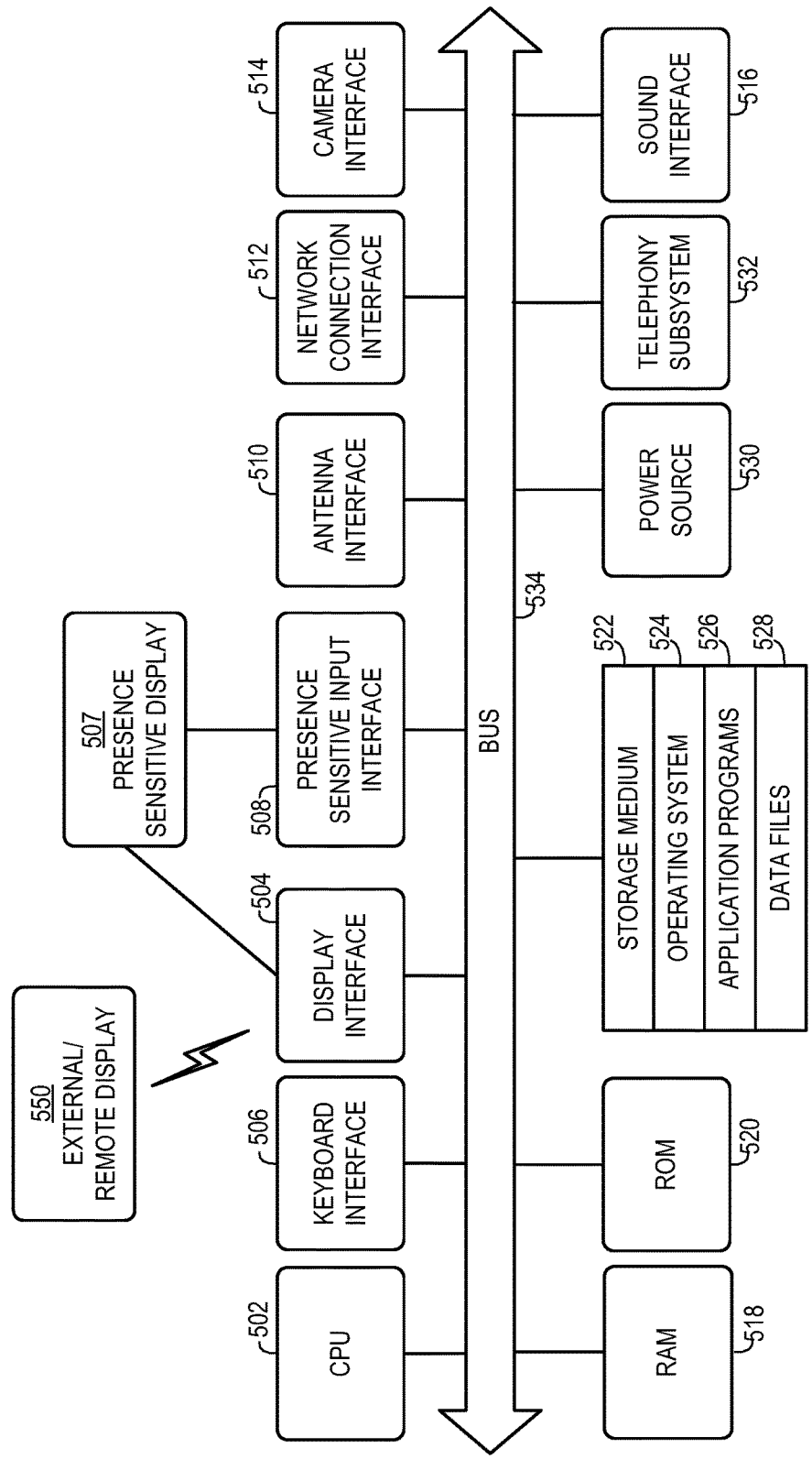
FIG. 5 illustrates a computer architecture that may implement aspects of the present disclosure.

As desired, implementations of the disclosed technology may include a computing device, such as server(s) 110, database(s) 120, and terminal(s) 130 with more or less of the components illustrated in FIG. 5. The computing device architecture 500 is provided for example purposes only and does not limit the scope of the various implementations of the present disclosed computing systems, methods, and computer-readable mediums.

The computing device architecture 500 of FIG. 5 includes a central processing unit (CPU) 502, where executable computer instructions are processed; a display interface 504 that supports a graphical user interface and provides functions for rendering video, graphics, images, and texts on the display. In certain example implementations of the disclosed technology, the display interface 504 connects directly to a local display, such as a touch-screen display associated with a mobile computing device. In another example implementation, the display interface 504 provides data, images, and other information for an external/remote display 550 that is not necessarily physically connected to the mobile computing device. For example, a desktop monitor can mirror graphics and other information presented on a mobile computing device. In certain example implementations, the display interface 504 wirelessly communicates, for example, via a Wi-Fi channel or other available network connection interface 512 to the external/remote display.

In an example implementation, the network connection interface 512 can be configured as a wired or wireless communication interface and can provide functions for rendering video, graphics, images, text, other information, or any combination thereof on the display. In one example, a communication interface can include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof.

The computing device architecture 500 can include a keyboard interface 506 that provides a communication interface to a physical or virtual keyboard. In one example implementation, the computing device architecture 500 includes a presence-sensitive display interface 508 for connecting to a presence-sensitive display 507. According to certain example implementations of the disclosed technology, the presence-sensitive input interface 508 provides a communication interface to various devices such as a pointing device, a capacitive touch screen, a resistive touch screen, a touchpad, a depth camera, etc. which may or may not be integrated with a display.

The computing device architecture 500 can be configured to use one or more input components via one or more of input/output interfaces (for example, the keyboard interface 506, the display interface 504, the presence sensitive input interface 508, network connection interface 512, camera interface 514, sound interface 516, etc.) to allow the computing device architecture 500 to present information to a user and capture information from a device's environment including instructions from the device's user. The input components can include a mouse, a trackball, a directional pad, a track pad, a touch-verified track pad, a presence-sensitive track pad, a presence-sensitive display, a scroll wheel, a digital camera including an adjustable lens, a digital video camera, a web camera, a microphone, a sensor, a smartcard, and the like. Additionally, an input component can be integrated with the computing device architecture 500 or can be a separate device. As additional examples, input components can include an accelerometer, a magnetometer, a digital camera, a microphone, and an optical sensor.

Example implementations of the computing device architecture 500 can include an antenna interface 510 that provides a communication interface to an antenna; a network connection interface 512 can support a wireless communication interface to a network. As mentioned above, the display interface 504 can be in communication with the network connection interface 512, for example, to provide information for display on a remote display that is not directly connected or attached to the system. In certain implementations, a camera interface 514 is provided that acts as a communication interface and provides functions for capturing digital images from a camera. In certain implementations, a sound interface 516 is provided as a communication interface for converting sound into electrical signals using a microphone and for converting electrical signals into sound using a speaker. According to example implementations, a random access memory (RAM) 518 is provided, where executable computer instructions and data can be stored in a volatile memory device for processing by the CPU 502.

According to an example implementation, the computing device architecture 500 includes a read-only memory (ROM) 520 where invariant low-level system code or data for basic system functions such as basic input and output (I/O), startup, or reception of keystrokes from a keyboard are stored in a non-volatile memory device. According to an example implementation, the computing device architecture 500 includes a storage medium 522 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), for storing files include an operating system 524, application programs 526 (including, for example, a web browser application, a widget or gadget engine, and or other applications, as necessary), and data files 528. According to an example implementation, the computing device architecture 500 includes a power source 530 that provides an appropriate alternating current (AC) or direct current (DC) to power components.

According to an example implementation, the computing device architecture 500 includes a telephony subsystem 532 that allows the device 500 to transmit and receive audio and data information over a telephone network. Although shown as a separate subsystem, the telephony subsystem 532 may be implemented as part of the network connection interface 512. The constituent components and the CPU 502 communicate with each other over a bus 534.

According to an example implementation, the CPU 502 has appropriate structure to be a computer processor. In one arrangement, the CPU 502 includes more than one processing unit. The RAM 518 interfaces with the computer bus 534 to provide quick RAM storage to the CPU 502 during the execution of software programs such as the operating system, application programs, and device drivers. More specifically, the CPU 502 loads computer-executable process steps from the storage medium 522 or other media into a field of the RAM 518 in order to execute software programs. Data can be stored in the RAM 518, where the data can be accessed by the computer CPU 502 during execution. In one example configuration, the device architecture 500 includes at least 528 MB of RAM, and 256 MB of flash memory.

The storage medium 522 itself can include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system, can be tangibly embodied in storage medium 522, which can include a machine-readable storage medium.

According to one example implementation, the term computing device, as used herein, can be a CPU, or conceptualized as a CPU (for example, the CPU 502 of FIG. 5). In this example implementation, the computing device (CPU) can be coupled, connected, and/or in communication with one or more peripheral devices, such as display. In another example implementation, the term computing device, as used herein, can refer to a mobile computing device such as a smartphone, tablet computer, or smart watch. In this example implementation, the computing device outputs content to its local display and/or speaker(s). In another example implementation, the computing device outputs content to an external display device (e.g., over Wi-Fi) such as a TV or an external computing system.

In example implementations of the disclosed technology, a computing device includes any number of hardware and/or software applications that are executable to facilitate any of the operations. In example implementations, one or more I/O interfaces facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., can facilitate user interaction with the computing device. The one or more I/O interfaces can be utilized to receive or collect data and/or user instructions from a wide variety of input devices. Received data can be processed by one or more computer processors as desired in various implementations of the disclosed technology and/or stored in one or more memory devices.

One or more network interfaces can facilitate connection of the computing device inputs and outputs to one or more suitable networks and/or connections; for example, the connections that facilitate communication with any number of sensors associated with the system. The one or more network interfaces can further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, including a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, Internet tablets, PDAs, ultra-mobile PCs (UMPCs) and smartphones.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one implementation," "an implementation," "example implementation," "various implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Exemplary embodiments of the present invention include devices, systems, and methods of identifying and isolating program portions subject to use restrictions and vulnerability issues.

A method according to an exemplary embodiment of the present invention can comprise parsing a program to identify a plurality of features within the program, performing a first match of the plurality of features to a plurality of code files based on a hierarchical code index, the features corresponding to leaf nodes of the hierarchical code index and the code files corresponding to parent nodes of the leaf nodes, normalizing the first match results to weight against common features, performing a second match of the plurality of code files to one or more code repositories based on the hierarchical code index, normalizing the second match results to weight against common files, and identifying a code repository of the one or more code repositories as being included within the program.

The features can include at least one from among string literals, function names, parameter types, class names, and name spaces.

The method can further comprise generating a respective identifier for each of the plurality of features, wherein performing the first match includes querying the hierarchical code index with the respective identifiers.

Performing the first match can include skipping highly linked files.

The method can further comprise determining a version of the identified code repository included within the program.

Determining the version can include distinguishing between a plurality of versions of the identified code repository based on co-location information of features within the hierarchical code index.

A system according to an exemplary embodiment of the present invention can comprise one or more processors, and one or more memories have stored thereon instructions that, when executed by the one or more processors, control the one or more processors to identify files within a computer to identify a plurality of files within a program code, the program code being organized in accordance with a hierarchical structure having a root repository, generate a feature identifier for each of a plurality of respective features of each of the plurality of files, derive a file identifier for each of the plurality of files based on the identifiers for the respective features of the plurality of files, derive a node identifier for each level of the hierarchical structure based on the files included therein, and map the features, file, and node identifiers as parent-child relationships within a hierarchical index based on the hierarchical structure of the program code.

The plurality of features can include at least one from among string literals, function names, parameter types, class names, and namespaces for functions within each of the plurality of files.

The instructions, when executed by the one or more processors, can further control the one or more processors to separately index source files and header files from within the program code, preserving the hierarchical structure of the program code.

Deriving the file identifiers and the node identifiers can include applying a Locality Sensitive Hash the feature identifiers of features included within the respective files and levels.

The instructions, when executed by the one or more processors, can further control the one or more processors to determine a respective Hamming distance for each of the feature, file, and node identifiers to existing mappings in the hierarchical index, and in response to determining that a Hamming distance is below a threshold, skip mapping of the respective feature, file, or node and all sub-portions of the hierarchical structure of the code.

The instructions, when executed by the one or more processors, can further control the one or more processors to identify a conditional branch within the program code, derive identifiers for features, file, and nodes within the conditional branch, and mapping the conditional branch within the hierarchical index as a conditional group of extracted features.

The instructions, when executed by the one or more processors, can further control the one or more processors to identify one or more unique feature sets within a code version of the program code, and separately index the one or more unique feature sets to distinguish between code versions.

The one or more unique feature sets can include co-location information corresponding to bi-directional mapping between parents and children within the hierarchical structure of the program code.

The instructions, when executed by the one or more processors, can further control the one or more processors to crawl a code repository to identify the program code.

A non-transitory computer readable medium having stored thereon instructions for performing a method according to an exemplary embodiment of the present invention can comprise parsing a program to identify a plurality of features within the program, and identifying a third-party code included within the program by matching the plurality of features to a plurality of leaf nodes of a hierarchical index structure, recursively matching the nodes to higher level nodes within the hierarchical index structure to identify a top-level repository node match, and identifying the third-party code corresponding to the top-level repository node.

The stored instructions on the non-transitory computer readable medium can perform a method further comprising determining a version of the identified third-party code included within the program.

Determining the version can include determining the version based on a bi-directional between the leaf nodes and the top-level repository node.

Identifying the third-party code can further include normalizing matches to higher level nodes based on relative uniqueness.

Identifying the third-party code can further include filtering the higher level nodes based on the normalization.

What is claimed is:

1. A method comprising:
    detecting open source software (OSS) component reuse in a program comprising:
        extracting one or more features from one or more application binaries of the program; and
    comparing one or more of the extracted features against an indexing database of OSS code files; and
    evaluating one or more of any detected OSS component reuse in the program comprising:
    identifying potential compliance violations of OSS license requirements using the detected OSS component in the program; and
    identifying potential risk vulnerabilities using the detected OSS component in the program;
    wherein the extracting and comparing comprises:
        parsing the program to identify the one or more extracted features within the program;
        performing a first match of the extracted features to the OSS code files of the indexing database based on a hierarchical code index,
        the extracted features corresponding to leaf nodes of the hierarchical code index and the OSS code files corresponding to parent nodes of the leaf nodes;
        normalizing the first match results to weight against common features;
        performing a second match of the OSS code files of the indexing database to one or more OSS code repositories based on the hierarchical code index; and
        normalizing the second match results to weight against common files; and
        wherein upon identifying an OSS code repository of the one or more OSS code repositories as being included within the program, OSS component reuse in the program has been detected;
    determining a version of the identified OSS code repository included within the program.

2. The method of claim 1, wherein the extracted features comprise at least one from among string literals, function names, parameter types, class names, and name spaces.

3. The method of claim 1 further comprising generating a respective identifier for each of the extracted features, wherein performing the first match comprises querying the hierarchical code index with the respective identifiers.

4. The method of claim 1, wherein performing the first match comprises skipping highly linked files.

5. The method of claim 1, wherein determining the version comprises distinguishing between a plurality of versions of the OSS identified code repository based on co-location information of extracted features within the hierarchical code index.

6. The method of claim 1, wherein the application binaries are selected from the group consisting of executable files and native libraries.

7. A non-transitory computer readable medium having stored thereon instructions for performing a method comprising:
    detecting third-party code in a program comprising:
        extracting one or more features from one or more application binaries of the program; and
        comparing one or more of the extracted features against an indexing database of third-party code files; and
        evaluating one or more of any detected third-party code in the program comprising:
        identifying potential compliance violations of third-party license requirements using the detected third-party code in the program; and
        identifying potential risk vulnerabilities using the detected third-party code in the program;
        wherein the extracting and comparing comprises:
        parsing the program to identify one or more extracted features within the program; and
        identifying the third-party code included within the program by:
            matching the features extracted to leaf nodes of a hierarchical index structure recursively matching the leaf nodes to higher level nodes within the hierarchical index structure to identify a top-level repository node match; and
            identifying the third-party code corresponding to the top-level repository node;
    determining a version of the identified OSS code repository included within the program.

8. The non-transitory computer readable medium of claim 7, wherein the method further comprises determining a version of the identified third-party code included within the program.

9. The non-transitory computer readable medium of claim 8, wherein determining the version comprises determining the version based on a bi-directional between the leaf nodes and the top-level repository node.

10. The non-transitory computer readable medium of claim 7, wherein identifying the third-party code further comprises normalizing matches to higher level nodes based on relative uniqueness.

11. The non-transitory computer readable medium of claim 10, wherein identifying the third-party code further comprises filtering the higher level nodes based on the normalization.

12. The non-transitory computer readable medium of claim 7, wherein the application binaries are selected from the group consisting of executable files and native libraries.

13. A system comprising:
    one or more processors; and
    one or more memories have stored thereon instructions that, when executed by the one or more processors, control the one or more processors to:
    detect open source software (OSS) component reuse in a program comprising:
        extracting one or more features from one or more application binaries of the program; and
        comparing one or more of the extracted features against an indexing database of OSS code files; and
    evaluate one or more of any detected OSS component reuse in the program comprising:

identifying potential compliance violations of OSS license requirements using the detected OSS component in the program; and identifying potential risk vulnerabilities using the detected OSS component in the program;

wherein the extracting and comparing comprises:

parsing the program to identify the one or more extracted features within the program;

performing a first match of the extracted features to the OSS code files of the indexing database based on a hierarchical code index, the extracted features corresponding to leaf nodes of the hierarchical code index and the OSS code files corresponding to parent nodes of the leaf nodes;

normalizing the first match results to weight against common features;

performing a second match of the OSS code files of the indexing database to one or more OSS code repositories based on the hierarchical code index; and normalizing the second match results to weight against common files; and wherein upon identifying an OSS code repository of the one or more OSS code repositories as being included within the program, OSS component reuse in the program has been detected;

determining a version of the identified OSS code repository included within the program.

14. The system of claim 13, wherein the application binaries are selected from the group consisting of executable files and native libraries.

15. The system of claim 13, wherein the extracted features comprise at least one from among string literals, function names, parameter types, class names, and name_spaces.

16. The system of claim 13, wherein the instructions, when executed by the one or more processors, further control the one or more processors to separately index source files and header files from within the program, preserving a hierarchical structure of the program being organized in accordance with the hierarchical structure having a root repository.

* * * * *